Sept. 24, 1957  S. V. WIRANT  2,807,161
MEANS FOR CHECKING LANDING GEAR TIRE PRESSURES
AND FOR FREEING JAMMED LANDING GEAR
Filed May 12, 1954

INVENTOR.
SYLVESTER V. WIRANT
BY
Christy Parmelee & Strickland

United States Patent Office 2,807,161
Patented Sept. 24, 1957

2,807,161

MEANS FOR CHECKING LANDING GEAR TIRE PRESSURES AND FOR FREEING JAMMED LANDING GEAR

Sylvester V. Wirant, Pittsburgh, Pa.

Application May 12, 1954, Serial No. 429,345

2 Claims. (Cl. 73—81)

The invention pertains to a means for checking landing gear tire pressures and a further means for freeing jammed landing gear to be lowered by the usual mechanism provided for this purpose.

It is customary for the larger commercial and military planes when in flight to have the landing gear, including wheels, retracted within the body of the plane to reduce wind resistance and to lower same prior to landing. A soft tire on the landing gear wheels, if unknown to the pilot, causes the plane to tip to one side during the landing operation and may result in a serious accident. If the pilot is aware of the tire being under-inflated he can compensate therefor and achieve a safe landing. It is an object of the invention to provide means for checking the degree of inflation in each of the retracted wheel tires prior to the gear being lowered for landing.

Infrequently the mechanism for retracting and lowering the landing gear becomes locked in retracted position and can not function to lower the retracted landing gear. In such cases the landing gear can be lowered only if some added effort can be exerted thereon to assist the usual mechanism for this purpose. It is another object of the invention to provide a means, controllable from the pilot's cabin, to provide this added effort to release the landing gear for lowering.

In the drawings forming part of this disclosure,

Figure 1:
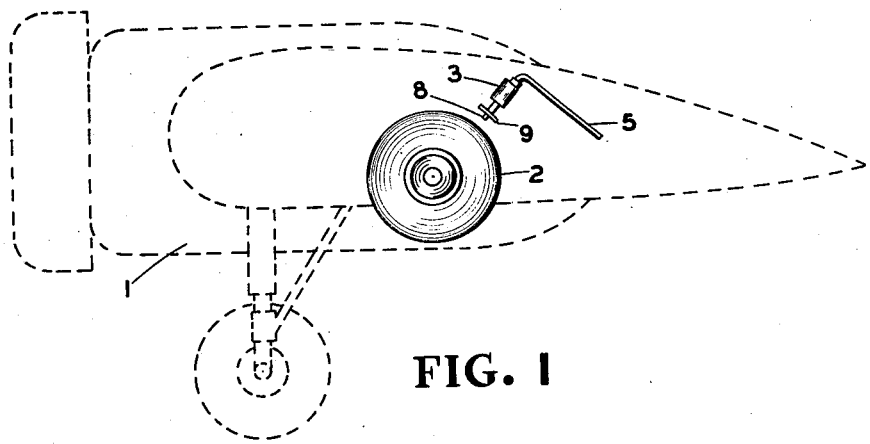
Fig. 1 shows in side elevation a portion of a plane with the landing gear wheels indicated by dotted lines in lowered position and the wheel and tire by full lines in retracted position.
Figure 2:
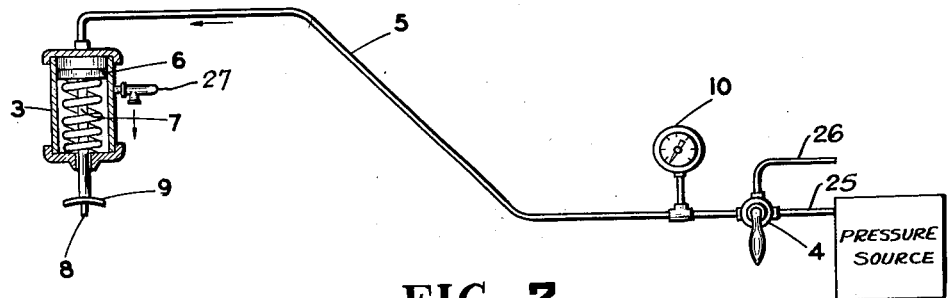
Fig. 2 shows a fluid pressure actuated mechanism for testing the degree of tire inflation and, if necessary, freeing the landing gear for lowering.

Referring now in detail to the drawings, reference character 1 indicates a portion of an airplane as shown in dotted lines with the landing gear in lowered position. The landing gear wheel 2 is shown by full lines on Fig. 1 when in retracted position. Mounted on the plane structure adjacent the wheel 2, when in retracted position, is a hydraulic cylinder 3 energized from the cockpit of the plane by a suitable valve 4 connected therewith by a conduit 5. Within the cylinder 3 is a suitable piston 6 having a piston rod 7 extending through one end of the cylinder and terminating in an indentor 8 disposed adjacent the tire of wheel 2. Rigidly attached to indentor 8 in spaced relation to its tip and secured to piston rod 7 is a shoe 9 for engagement with the wheel tire when full cylinder pressure is required to free the jammed landing gear so that the usual lowering mechanism can function. A pressure gauge 10 disposed in conduit 5 and within the cockpit records the resistance of the tire of wheel 2 against deflection by indentor 8 to establish tire air pressure. Conduit 25 connects valve 4 with a source of fluid pressure which is shown conventionally at 28. Valve 4 when closed has a port (not shown) connected by conduit 26 for venting pressure in conduit 5.

Prior to energizing the usual mechanism for lowering the retracted landing gear and wheels 2, the pilot partially opens a valve 4 admitting fluid pressure to cylinder 3 through conduit 5 causing the piston rod 7 to move downwardly bringing indentor 8 into engagement with the tire of wheel 2 and registering resistance of the tire to deflection on gauge 10 which is also tire air pressure. Should the degree of tire inflation be such as to permit the shoe 9 to engage the tire, the resistance to further movement of piston 7 would be registered on gauge 10 as greater than normal tire pressure indicating a badly under-inflated tire. Valve 4 would then be closed. The outlet 27 in cylinder 3 permits free exhaust of air below piston 6 preventing false pressure recordings. Having determined the degree of inflation of the tire of each landing wheel the pilot would then operate the landing gear lowering mechanism and compensate for any under-inflation of the wheel tire at either side of the plane during the landing operation. Should the landing gear be jammed so that the lowering mechanism is unable to operate, the pilot can then operate valve 4 to admit full fluid pressure from line 25 to cylinder 3 pressing the shoe 9 against the tire to force the landing gear downwardly a distance equal to the full stroke of the piston 6. Such preliminary movement of the landing gear would release same from its locked position permitting the usual lowering mechanism to function.

The exact details of construction disclosed and described are for purposes of illustration and not limitation except as made necesary by the scope of the appended claims.

I claim:

1. An airplane safety device for landing gear wheel tires when in retracted position, in combination, a fluid pressure actuated cylinder mounted on the plane in adjacent spaced relation to a tire, a piston within said cylinder and a piston stem thereon extending through the cylinder for engagement with the tire, said stem terminating in an indentor for depression of a portion of the tire against air inflation therein, a source of fluid pressure, a conduit connecting the cylinder with said source, a valve in said conduit for selectively admitting a portion or all of the fluid pressure from said source, a gauge in said conduit between said valve and cylinder registering fluid pressure passing therethrough, a shoe mounted on the piston rod rearwardly of the indentor for limiting depression of the tire by the indentor, said shoe providing a bearing against the tire for bodily displacement of the tire and wheel under full application of fluid pressure to the cylinder.

2. An airplane safety device for landing gear wheel tires in retracted position, in combination, a tire indentor movably mounted on the plane in adjacent spaced relation to a tire, means on said airplane for selectively and forcibly advancing the indentor into engagement with and depressing of the tire, means associated with the indentor for registering the resistance of the tire to depression by the indentor, and a shoe mounted on the indentor in spaced relation to the tire engaging end of the indentor for engaging the tire to cause bodily downward movement of the tire and associated wheel upon selective operation of the first means for application of a greater force upon the indentor for emergency release of a jammed landing gear.

References Cited in the file of this patent

UNITED STATES PATENTS

| 660,445 | Lillicrap | Oct. 23, 1900 |
| 1,894,490 | Hobson | Jan. 17, 1933 |
| 2,115,701 | Baer et al. | May 3, 1938 |
| 2,152,159 | Smith et al. | Mar. 28, 1939 |
| 2,184,260 | Sutton | Dec. 19, 1939 |
| 2,384,437 | Boynton | Sept. 11, 1945 |
| 2,685,197 | Menneson | Aug. 3, 1954 |

FOREIGN PATENTS

| 542,910 | Great Britain | Feb. 2, 1942 |